United States Patent
Horvath et al.

[11] 3,791,733
[45] Feb. 12, 1974

[54] PHOTOGRAPHIC DEVICE FOR ACHIEVING A DOMINANT COLOR EFFECT

[75] Inventors: Stefan Horvath; Aurel Miheles, both of Bucharest, Romania

[73] Assignee: Studioul Cinematographic Bucuresti, Bucahrest, Romania

[22] Filed: Jan. 17, 1972

[21] Appl. No.: 218,265

Related U.S. Application Data

[63] Continuation-in-part of Ser. No. 850,071, Aug. 19, 1969, abandoned.

[30] Foreign Application Priority Data
July 12, 1966  Romania .............................. 51853

[52] U.S. Cl. ............................................... 355/39
[51] Int. Cl. ............................................ G03b 27/70
[58] Field of Search .... 355/39; 240/1.3; 95/11, 11.5

[56] References Cited
UNITED STATES PATENTS

| | | |
|---|---|---|
| 1,763,231 | 6/1930 | Fritts .................................. 355/39 |
| 1,885,555 | 11/1932 | Schwartz ............................ 355/39 |
| 631,222 | 8/1899 | Mason ................................. 95/11 |
| 1,253,137 | 1/1918 | Brewster ............................. 355/32 |

*Primary Examiner*—John M. Horan

[57] ABSTRACT

A device to be used in photography for achieving a dominant color effect. Thus the device can be attached to the objective of any camera. It has a tubular enclosure open at both ends and is carrying at one end a fastener for releasably fastening the enclosure to an objective. Adjacent its other end the enclosure has a means for supporting a special color filter. Between the color filter and the objective is an illuminating structure for illuminating the color filter so as to achieve the dominant color effect. Between the illuminating structure and the objective is a shielding structure to prevent the light from the light source from travelling back to the objective, so that in this way the light is primarily directed toward the filter.

3 Claims, 1 Drawing Figure

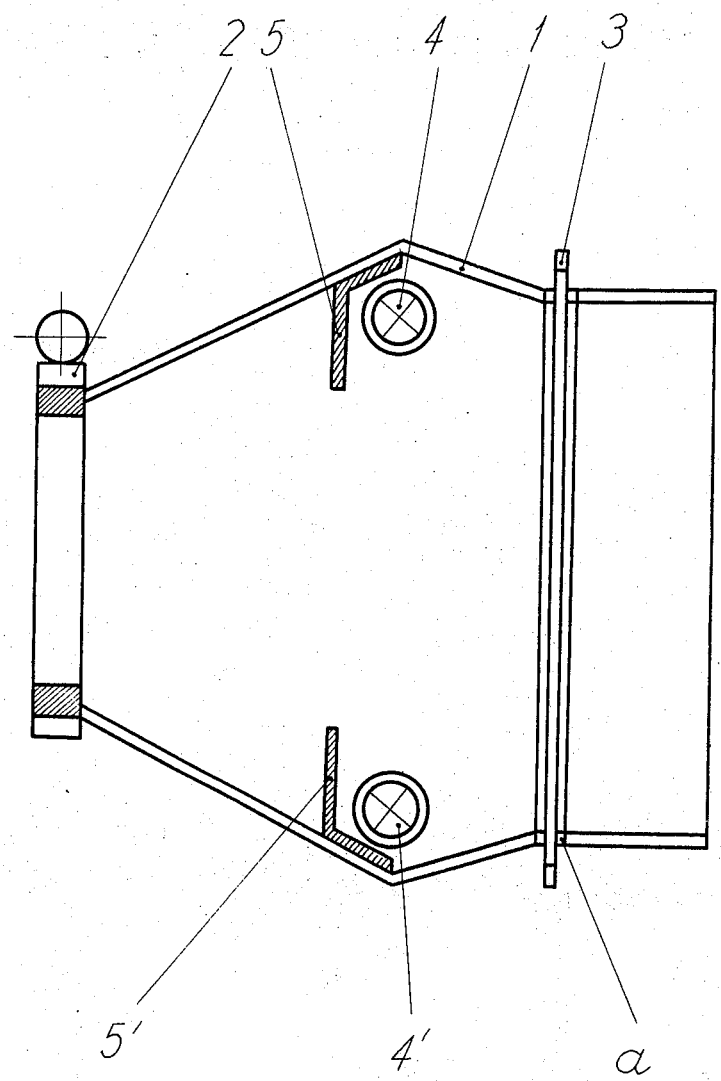

3,791,733

PHOTOGRAPHIC DEVICE FOR ACHIEVING A DOMINANT COLOR EFFECT

This is a continuation-in-part of copending U.S. Pat. application Ser. No. 850,071 filed on Aug. 19, 1969 and entitled PHOTOGRAPHIC DEVICE FOR ACHIEVING A DOMINANT COLOR EFFECT, now abandoned.

BACKGROUND OF THE INVENTION

The present invention relates to photographic devices. In particular, the present invention relates to devices for achieving a dominant color effect with photographic devices such as motion picture cameras, still-picture cameras, or television cameras.

There are, of course, many known devices for attaching color filters to all types of cameras, with the filters being carried by suitable mounts attached directly to the objective of the camera. However, these conventional devices have the drawback of failing to provide for sufficient illumination of the color filters so as to achieve a dominant color effect.

SUMMARY OF THE INVENTION

It is accordingly a primary object of the present invention to provide a construction which will avoid these drawbacks.

In particular, it is an object of the invention to provide a construction which will enable a color filter of a special type to be illuminated to an extent sufficient to achieve the required dominant color effect.

Furthermore, it is an object of the invention to provide a construction of this type which will enable the particular dominant color used to be selected.

Also, it is an object of the invention to provide a construction not only capable of achieving required illumination to provide the dominant color effect but also capable of preventing undesirable light from reaching the camera objective.

According to the invention, an elongated tubular enclosure is provided with opposed open ends and is connected at one of these ends, by a suitable means, to an objective of a camera in a manner enabling the tubular enclosure to be removed from the objective whenever desired. Adjacent its other open end the elongated tubular enclosure is formed with a slot so as to permit a color filter of a special type to be mounted in the tubular enclosure extending across the same perpendicularly to the optical axis. Between the color filter and the objective is an illuminating means for illuminating the color filter, and between the illuminating means and the objective is a screen or shielding structure to prevent light from travelling from the illuminating means back to the objective while permitting the light primarily to travel toward the filter to achieve the desired dominant color.

BRIEF DESCRIPTION OF DRAWING

The invention is illustrated by way of example in the accompanying drawing forming part of this application and showing the structure of the invention schematically in a longitudinal sectional elevation.

DESCRIPTION OF A PREFERRED EMBODIMENT

Referring now to the drawing it will be seen that the structure of the invention includes an elongated tubular enclosure 1 having a pair of opposed open ends. At its left open end, as viewed in the drawing, the enclosure 1 is provided with a means 2 for releasably fixing the tubular enlosure to the front end of an objective of a camera, which may be a motion picture camera, a still camera, or a television camera. This means 2 may include any suitable ring having an interior diameter sufficiently great to enable it to be slipped over the front end of the objective. At the exterior of the ring any suitable set screw structure or the like may be provided, as indicated at the upper left corner of the drawing, to enable the entire device to be releasably attached to the objective of the camera with the optical axis coinciding with the central axis of the tubular enclosure 1.

Adjacent its opposite, right open end, as viewed in the drawing, the elongated tubular enclosure 1 is formed with a slit a enabling a color filter 3, of the type described in our U.S. Pat. No. 3,545,849, to be inserted into the position shown in the drawing. This filter 3 comprises a net made of cotton or synthetic fiber threads and is painted with the desired dominant color and this filter 3 is arranged at a distance from the objective of the camera which does not exceed "the zone of non-clarity" of the objective of the camera. "The zone of non-clarity" is intended to describe that area in the field of vision of a camera between the camera lens and the closest plane in the depth field Such slits for accommodating a color filter in a tubular mounting are well-known, and the color filter 3 may have any desired color and is selected from among a group of color filters of different colors. The elongated tubular enclosure 1 is painted a dull black, so as to avoid any possible reflection, and is made of metal. The particular embodiment shown in the drawing may be adapted for attachment to the objective of a motion picture camera which is not shown.

In accordance with the invention an illuminating means is provided for illuminating the color filter 3. The illuminating means in the illustrated example takes the form of a pair of lamps or light sources 4 and 4'. These light sources are situated equidistantly from and on directly opposed sides of the optical axis. The pair of light sources or lamps 4 and 4' may be removably mounted in any suitable sockets connected through suitable wiring to a battery of the camera, such as the battery which is used to drive the motion picture camera. Thus, through a suitable switch, which is not illustrated, it is possible to close the circuit of the lamps 4 and 4' so as to illuminate them whenever desired in order to achieve a dominant color effect in accordance with the selected color of the filter 3.

In order to prevent light from the illuminating means 4, 4' from travelling undesirably back to the objective of the camera, a shielding or screen means 5, 5' is provided. This shielding means takes the form of a pair of opaque angle members 5 and 5' affixed to the interior of the tubular enclosure 1 in the manner indicated schematically in the drawing so that these screens or shields 5 and 5' extend between the light sources 4 and 4' and the objective, thus preventing light from travelling to the left, as viewed in the drawing, toward the objective. However, the light can travel freely to the color filter 3, so that the light from the illuminating means 4 and 4' is used primarily for illuminating the color filter 3.

It is to be noted that from the means 2, which releasably fastens the enclosure 1 to the objective, the tubular enclosure 1 flares outwardly and is of a frustoconical configuration, with the right open end being of a substantially larger diameter than the left open end of the tubular enclosure 1, as viewed in the drawing. In this way it becomes possible to locate both the illuminating means 4, 4' and the shielding means 5, 5' outwardly beyond a circle surrounding and having its center located in the optical axis and having a diameter equal to that of the objective. In this way neither the light sources 4 and 4' nor any portions of the shields 5 and 5' can extend into the field of view of the objective.

It is to be noted that with the structure of the invention an exceedingly simple and sturdy device is provided. Not only is it rugged, but in addition it can be manufactured at relatively low cost, is easy to mount on and remove from the camera, and is exceedingly easy to manipulate.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A photostatic device for achieving a dominant color effect, comprising an elongated tubular enclosure having a pair of opposed open ends, fixing means carried by said enclosure at one of said ends thereof for releasably fixing said enclosure to an objective of a camera so that light entering through the other end of said enclosure will reach the objective, said tubular enclosure having means for removably supporting a filter of a predetermined color in the path of light travelling through said enclosure to the objective at a distance from said objective which does not exceed "the zone of non-clarity" of said objective, said filter comprises net means of said predetermined color corresponding to said dominant color effect, illuminating means carried by said tubular enclosure between said objective and said filter, for illuminating said filter mounted in said supporting means, screening mounted on said tubular enclosure between said illuminating means and said objective for preventing light from said illuminating means from travelling back to the objective, so that the light will travel from the light sources primarily to the filter, said tubular enclosure flares outwardly from said fixing means thereby locating said screen means and light sources outwardly beyond a circle of the diameter and coaxial with the objective.

2. The photographic device as set forth in claim 1, wherein said illuminating means includes a pair of light sources respectively situated at equal distances from and at diametrically opposed sides of the optical axis.

3. The photographic device as set forth in claim 1, wherein the interior surface of said elongated tubular enclosure is painted dull black.

* * * * *